US007588496B2

(12) United States Patent
Van Asdale

(10) Patent No.: US 7,588,496 B2
(45) Date of Patent: Sep. 15, 2009

(54) COMBINATION GAMING APPARATUS AND METHOD

(75) Inventor: Shawn Van Asdale, Reno, NV (US)

(73) Assignee: IGT, Reno, NV (US)

( * ) Notice: Subject to any disclaimer, the term of this patent is extended or adjusted under 35 U.S.C. 154(b) by 344 days.

(21) Appl. No.: 10/226,446

(22) Filed: Aug. 23, 2002

(65) Prior Publication Data

US 2004/0038724 A1 Feb. 26, 2004

(51) Int. Cl.
*A63F 13/00* (2006.01)

(52) U.S. Cl. ............................ 463/20; 463/11; 463/12; 463/16; 463/21

(58) Field of Classification Search ............ 463/16–22, 463/11–12

See application file for complete search history.

(56) References Cited

U.S. PATENT DOCUMENTS

| | | | | | |
|---|---|---|---|---|---|
| 4,756,531 | A | * | 7/1988 | DiRe et al. | 463/18 |
| 5,106,100 | A | * | 4/1992 | Yih | 273/306 |
| 5,823,874 | A | * | 10/1998 | Adams | 463/17 |
| 5,997,401 | A | | 12/1999 | Crawford | |
| 6,120,031 | A | * | 9/2000 | Adams | 273/292 |
| 6,129,632 | A | | 10/2000 | Luciano | |
| 6,149,521 | A | * | 11/2000 | Sanduski | 463/13 |
| 6,159,096 | A | * | 12/2000 | Yoseloff | 463/20 |
| 6,190,254 | B1 | * | 2/2001 | Bennett | 463/13 |
| 6,234,897 | B1 | * | 5/2001 | Frohm et al. | 463/20 |
| 6,251,013 | B1 | * | 6/2001 | Bennett | 463/13 |
| 6,270,412 | B1 | * | 8/2001 | Crawford et al. | 463/20 |
| 6,299,170 | B1 | * | 10/2001 | Yoseloff | 273/292 |
| 6,485,366 | B1 | | 11/2002 | Rowe | |
| 6,485,367 | B1 | | 11/2002 | Joshi | |
| 6,517,432 | B1 | * | 2/2003 | Jaffe | 463/16 |
| 6,604,740 | B1 | * | 8/2003 | Singer et al. | 273/292 |
| 7,040,985 | B2 | * | 5/2006 | Vancura | 463/20 |
| 7,252,591 | B2 | * | 8/2007 | Van Asdale | 463/22 |

* cited by examiner

*Primary Examiner*—Dmitry Suhol
*Assistant Examiner*—William H McCulloch
(74) *Attorney, Agent, or Firm*—K&L Gates LLP

(57) ABSTRACT

A gaming unit may comprise a gaming display being operable to generate images and a controller operatively coupled to the gaming display. The controller may be programmed to select and display a number of player symbols and to generate an outcome of a plurality reels. The controller also may be programmed to display on the gaming display an outcome of the reels, to determine the initial award amount of the outcome of the reels and to determine whether one of the displayed player symbols has a predetermined relationship and can be played on the displayed reel symbols. If the player can play a displayed player symbol, the controller may be programmed to allow the player to play one of the displayed player symbols on the displayed reel symbols and credit an additional award amount.

48 Claims, 10 Drawing Sheets

COMBINATION GAMING APPARATUS AND METHOD

BACKGROUND OF THE INVENTION

This patent relates to a gaming apparatus for playing games. Conventional gaming units are typically provided with a cabinet and a gaming display mounted inside the cabinet. The gaming display may be mechanical, such as a series of stepper wheels, or may be electronic such as a video display that is capable of generating video images. Whether mechanical or electronic, the gaming display may be capable of generating images associated with a game, such as poker, blackjack, slots, keno, or bingo.

Traditional gaming units have either been focused on a single game or allow a player to select one of several games and then play that single game. Slot games allow a player to choose one or more paylines and spin a plurality of reels in the hopes that a winning combination of symbols on the stopped reels will appear on one or more of the paylines that were purchased. A payoff to the player depends on the specific symbols that occur on the purchased payline with more rare symbols resulting in higher payouts than more common symbols. Strategy in slot machines is limited as, the player can only select the machine to be played, the paylines to be played and the amount to play on each payline.

Games which permit the player to believe that strategy could potentially increase the winning amount may be better at holding a players attention for a longer period of time. In addition, games that allow a player to progress to a higher payoff may make the game more interesting to the player.

SUMMARY OF THE INVENTION

The patent is directed to a gaming unit that may comprise a cabinet having a gaming display supported inside the cabinet, the gaming display being operable to generate images and a controller operatively coupled to the gaming display. The controller may comprise a processor and a memory operatively coupled to the processor. The controller may be programmed to allow a person to make a wager. The controller may also be programmed to select and display a number of player symbols and to generate an outcome of a plurality of reels where the reels may include a number of reel symbols.

The controller also may be programmed to display on the gaming display an outcome of the spinning reels, to determine the initial award amount of the outcome of the reels and to determine whether one of the player symbols has a pre-determined relationship to the displayed reel symbols. If no displayed player symbols has a pre-determined relationship to the displayed reel symbols, the controller may be programmed to execute a failure response. If a displayed player symbol has a pre-determined relationship to one of the displayed reel symbols, the controller may be programmed to allow the player to play one of the displayed player symbols on the related displayed reel symbol. The controller may determine and credit an additional award amount.

The controller also may be programmed to determine whether a spin counter has reached an ending amount and to return the player to an entry screen if the spin counter has reach an ending value and to generate an additional outcome of the reels if the spin counter has not reached an ending value.

In another aspect, a method of playing a game on an electronic gaming unit is provided. The method may include allowing a person select a payline and allowing the person to place a wager. The method may include selecting and displaying a plurality of player symbols, generating an outcome of a plurality of reels where the reels have a plurality of reel symbols. The method may include displaying on a gaming display the outcome of the reels, determining an initial award amount based on the outcome of the reels and determining whether one of the player symbols has a pre-determined relationship to a displayed reel symbol. Additionally, the method may include executing a failure response if no displayed player symbol has a pre-determined relationship to the displayed reel symbols, allowing the player to play one of the player symbols on the related displayed reel symbol if one of the player symbols has a pre-determined realtionship to the displayed reel symbols, determining and crediting an additional award amount if one of the player symbols is played on the displayed reel symbols and generating an additional outcome of the reels if a number of purchased spins has not been completed.

According to another aspect, a programmed memory that is capable of being used in connection with an electronic gaming unit that allows a person to play a game, that dispenses value to the person at the conclusion of the game, and that may include a processor, an input device, and a currency accepting mechanism, is provided. The programmed memory may have a first memory portion physically configured in accordance with computer program instructions that may cause the electronic gaming unit to allow a person to make a wager if the programmed memory were incorporated into the electronic gaming unit and a second memory portion physically configured in accordance with computer program instructions that may cause the electronic gaming unit to select and display a plurality of player symbols if the programmed memory were incorporated into the electronic gaming unit.

A third memory portion may be physically configured in accordance with computer program instructions that would cause the electronic gaming unit to generate an outcome of reels including a plurality of reel symbols if the programmed memory were incorporated into the electronic gaming unit. A fourth memory portion physically configured in accordance with computer program instructions may cause the electronic gaming unit to display the outcome of the reels if the programmed memory were incorporated into the electronic gaming unit, a fifth memory portion physically configured in accordance with computer program instructions may cause the electronic gaming unit to determine an initial award amount of the outcome of the reels if the programmed memory were incorporated into the electronic gaming unit and a sixth memory portion physically configured in accordance with computer program instructions that may cause the electronic gaming unit to determine whether one of the player symbols has a pre-determined relationship to one of the displayed reel symbols if the programmed memory were incorporated into the electronic gaming unit.

A seventh memory portion physically configured in accordance with computer program instructions that may cause the electronic gaming unit to execute a failure response if no player symbols has a pre-determined relationship to the displayed reel symbols if the programmed memory were incorporated into the electronic gaming unit, an eighth memory portion physically configured in accordance with computer program instructions may cause the electronic gaming unit to allow a player to play one of the player symbol on the related displayed reel symbols if one of the player symbols has a pre-determined relationship to the displayed reel symbols if the programmed memory were incorporated into the electronic gaming unit and a ninth memory portion physically configured in accordance with computer program instructions may cause the electronic gaming unit to determine and credit an additional award amount if one of the player symbols is played on a related displayed reel symbols if the programmed memory were incorporated into the electronic gaming unit.

A tenth memory portion physically configured in accordance with computer program instructions may cause the electronic gaming unit to determine whether a final number of spins has been reached if the programmed memory were incorporated into the electronic gaming unit and an eleventh memory portion physically configured in accordance with computer program instructions that would cause the electronic gaming unit to generate an outcome of the reels if the final number of spins has not been reached if the programmed memory were incorporated into the electronic gaming unit.

The features and advantages of the present patent will be apparent to those of ordinary skill in the art in view of the detailed description of various embodiments, which is made with reference to the drawings, a brief description of which is provided below.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, it is not intended that the scope of any claim element be interpreted based on the application of 35 U.S.C. § 112, sixth paragraph.

Figure 1:
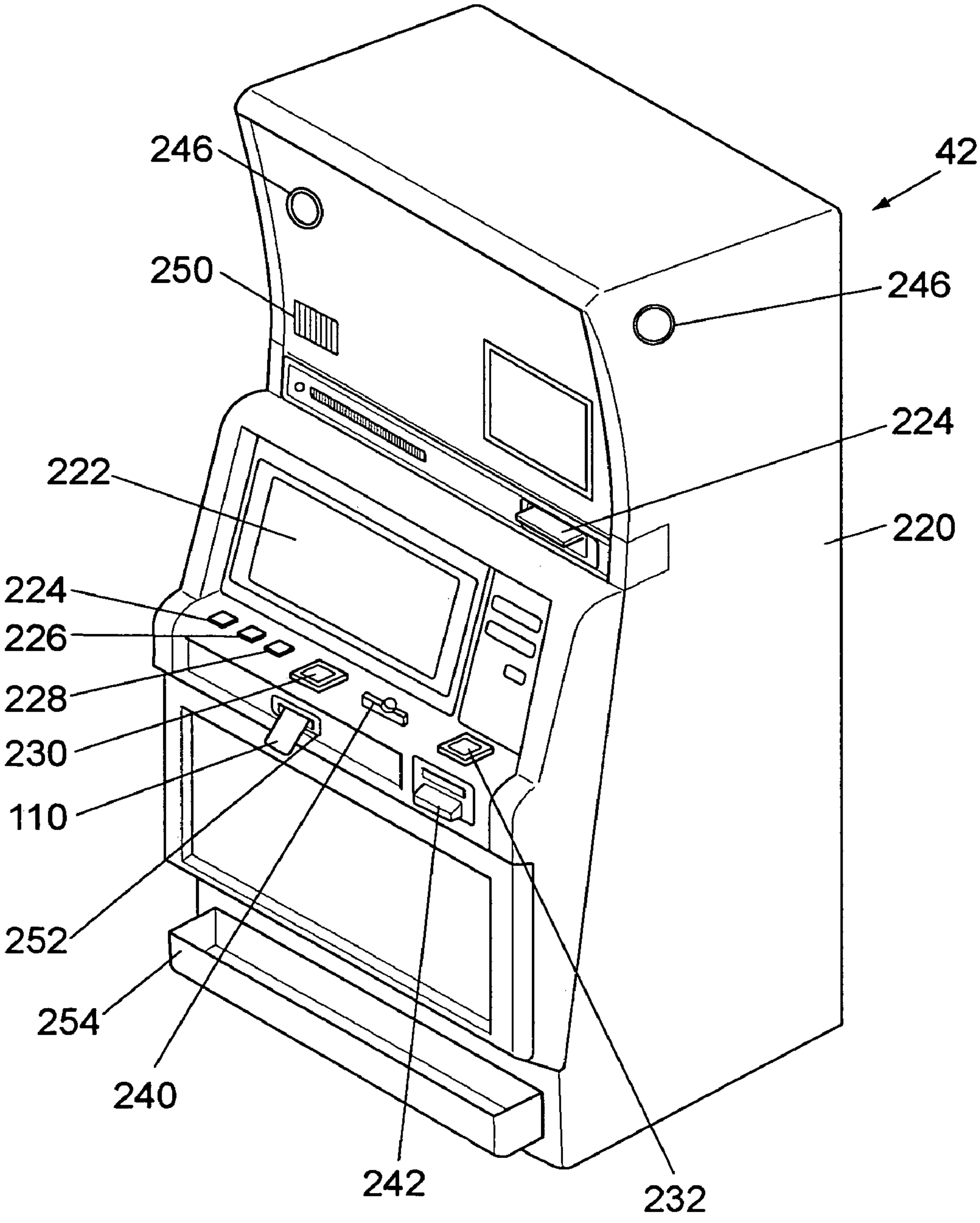
FIG. 1 is a perspective view of an embodiment of a gaming unit in accordance with the claims of the patent.

A gaming unit 42 incorporating the teachings of the claims is schematically illustrated at FIG. 1. The gaming unit 42 may be any type of gaming unit and may have various different structures and methods of operation. For exemplary purposes, a particular type of gaming unit 42 is described below, but it should be understood that numerous other types may be utilized in the gaming system.

Referring to FIG. 1, the gaming unit 42 may include a cabinet 220. A gaming display, such as color display unit 222, is disposed on the front of the cabinet 220 for displaying results and information associated with one or more games that a customer may play. While the gaming display 222 illustrated in FIG. 1 is a video display, it will be appreciated that other types of electronic displays, as well as mechanical displays, may be used. The gaming unit 42 may also include a variety of input devices, such as a plurality of buttons 224, 226, 228 that a customer may actuate to make wagers and game-specific selections such as selecting a card, a slots spin button 230, a cash out button 232, and/or any other type of input device.

The gaming unit 42 may include a variety of currency or value-accepting mechanisms that may be disposed on the front of the gaming unit 42 or in any other suitable location. The value-accepting mechanisms may include any device that can accept value from a customer. As used herein, the term "value" may encompass gaming tokens, coins, paper currency, ticket vouchers 110, and any other suitable objects representative of value. For example, the value-accepting mechanisms may include a coin acceptor 240 that accepts coins or tokens; a bill acceptor 242 that accepts and validates paper currency; a card or ticket reader 244 that accepts coupons, credit cards, printed cards, smart cards, ticket vouchers 110, etc.; and any other device that may accept a medium of value.

The gaming unit 42 may include additional features to enhance a player's game-playing experience, such as one or more audio speakers 246, a sound-generating circuit 248 (FIG. 2), and an aroma dispenser 250. The audio speakers 246 may provide various forms of sound relevant to the game that the player is playing. For example, the speakers 246 may generate audio representing sounds such as the noise of spinning slot machine reels, a dealer's voice, music, announcements or any other suitable audio related to a game. The aroma dispenser 250, which may be mounted above the display unit 222 or in any other suitable location on the gaming unit 42, may be manufactured by MicroScent or DigiScents.

The gaming unit 42 may also include a printer 252 disposed on the front of the gaming unit 42 or in any other suitable location. The printer 252 may be used, for example, to print the ticket vouchers 110 described above. The gaming unit 42 may also include a payout tray 254 of the type provided on slot machines, for example.

Gaming Unit Electronics

Figure 2:
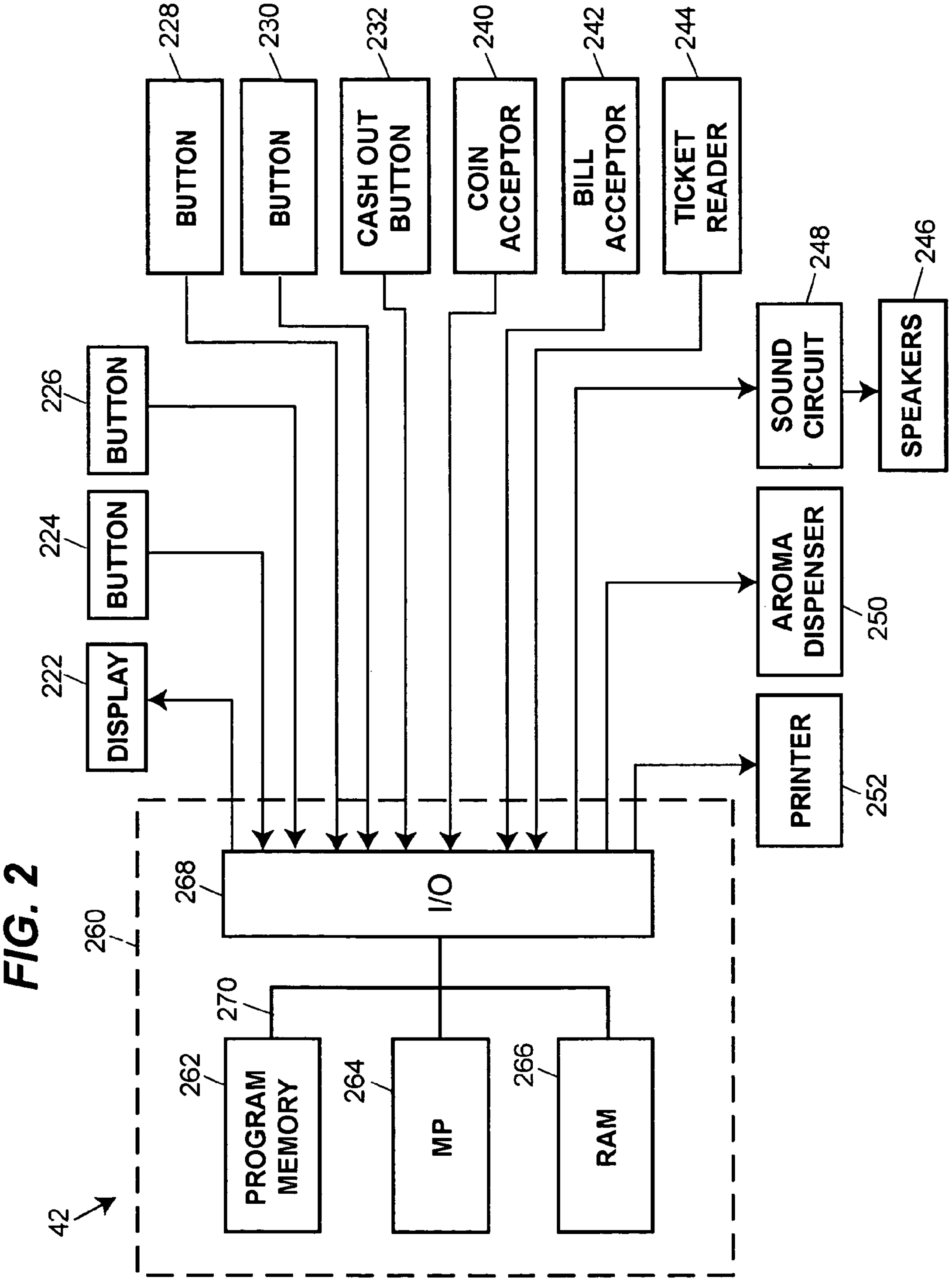
FIG. 2 is a block diagram of the electronic components of the gaming unit of FIG. 1.

FIG. 2 is a block diagram of a number of components that may be incorporated into the gaming unit 42. Referring to FIG. 2, the gaming unit 42 may include a controller 260 that may comprise a read-only memory (ROM) 262, a microcontroller or microprocessor (MP) 264, a random-access memory (RAM) 266 and an input/output (I/O) circuit 268, all of which may be interconnected via an address/data bus 270. It should be appreciated that although only one microprocessor 264 is shown, the controller 260 could include multiple microprocessors 264. Similarly, the memory of the controller 260 could include multiple RAMs 266 and multiple ROMs 262. Although the I/O circuit 268 is shown as a single block, it should be appreciated that the I/O circuit 268 could include a number of different types of I/O circuits. The RAM(s) 264 and ROM(s) 262 could be implemented as semiconductor memories, magnetically readable memories, and/or optically readable memories, for example.

FIG. 2 also illustrates that the components shown in FIG. 1 could be connected to the I/O circuit 268 via a respective direct line or conductor. Different connection schemes could be used. For example, one or more of the components shown in FIG. 2 could be connected to the I/O circuit 268 via a common bus or other data link that is shared by a number of components. Furthermore, some of the components could be directly connected to the microprocessor 264 without passing through the I/O circuit 268.

Overall Operation of Gaming Unit

One manner in which the gaming unit 42 may operate is described below in connection with a number of flowcharts which represent a number of portions or routines of one or more computer programs, which may be stored in one or more of the memories of the controller 260. The computer program(s) or portions thereof may be stored remotely, outside of the gaming unit 42, and may control the operation of the gaming unit 42 from a remote location. Such remote control may be facilitated with the use of a wireless connection, or by an Internet interface (not shown) that connects the gaming unit 42 with a remote computer (not shown) having a memory in which the computer program portions are stored via the Internet. The computer program portions may be written in any high level language such as C, C+, C++ or the like or any low-level, assembly or machine language. By storing the computer program portions therein, various portions of the memories 262, 266 are physically configured, either magnetically (e.g. in the case of a magnetic memory), electrically (e.g. in the case of a semiconductor memory) or structurally (e.g. in the case of an optical memory), in accordance with computer program instructions.

Figure 3:
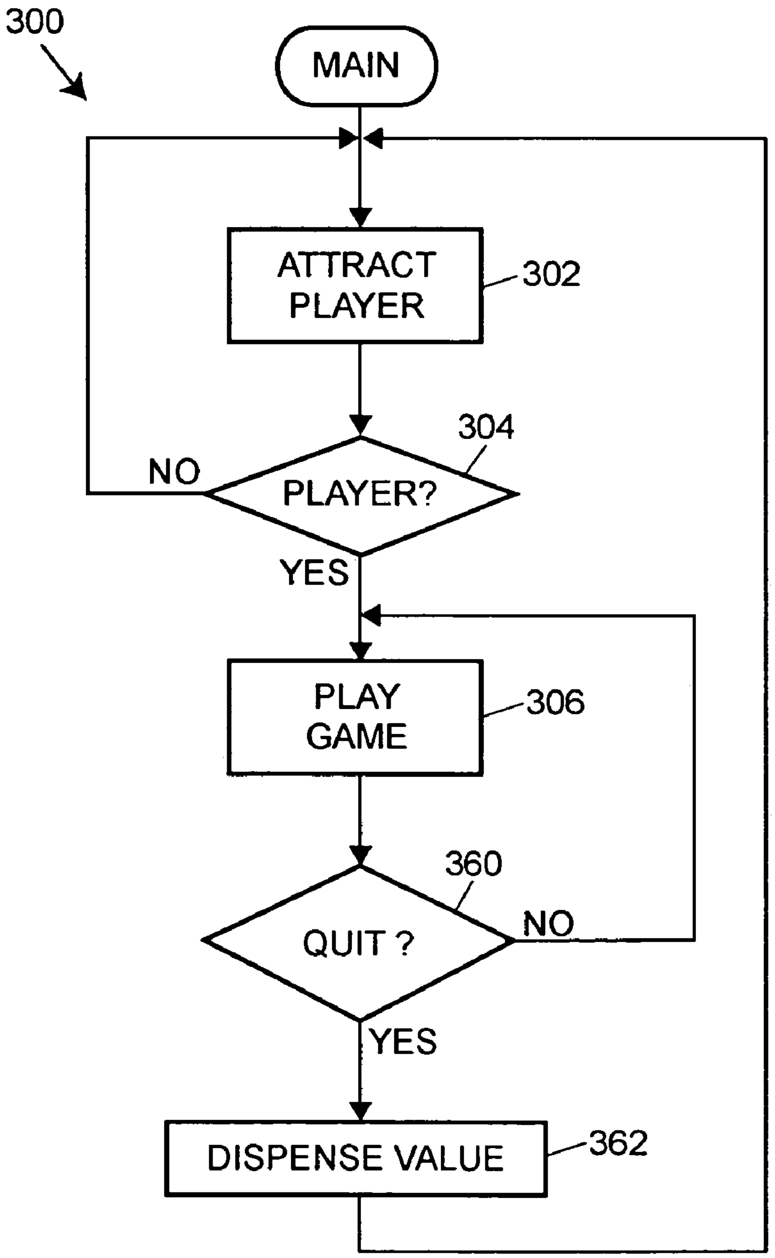
FIG. 3 is a flowchart of a main routine that may be performed by the controller shown in FIG. 2.

FIG. 3 is a flowchart of a main operating routine 300 that may be stored in the memory of the controller 260. Referring to FIG. 3, the main routine 300 may begin execution at block 302 at which player attraction graphics may be displayed on the display unit 222 (FIG. 2) of the gaming unit 42. Player attraction graphics may include a scrolling message of the total of any progressive jackpots, illustrations, videos, etc. While the graphics are being displayed, the controller 260 may intermittently check to see if a player is detected at block 304 by, for example, by polling the value-accepting devices 240, 242, 244 or one of the input devices 224, 226, 228. Alternatively, the value-accepting devices 240, 242, 244 and touchsensitive devices or buttons 224, 226, 228 may be programmed to notify the controller 260 when valid currency is inserted or player contact is detected, respectively. As long as no player is detected, the attraction graphics may be displayed at block 302.

At block 306, a game-selection graphic may be displayed on the display unit 222 to the player. Additionally, the player may be prompted to deposit value into the electronic gaming unit 42, via one of the value-accepting devices 240, 242, 244. The routine 300 may not proceed past the block 306 until the player deposits at least the minimum value required for the gaming unit 42. Any value that the player deposits may be stored as credit. In response to the detection of a deposit of currency or other value by the player, the controller 260 may cause the game to begin.

Alternatively, the game may be one choice of a variety of games available on the gaming unit. For example, the game routines could include a video poker routine, a video blackjack routine, a video slots routine, a video keno routine, and a video bingo routine. The gaming unit 42 may also be programmed to allow play of different games, such as a slot machine with mechanical wheels.

After the player has played the game, block 360 may be utilized to determine whether the player wishes to terminate play on the gaming unit 42 or to select another game. If the player wishes to stop playing the electronic gaming unit 42, which wish may be expressed, for example, by selecting a quit graphic displayed on the display unit 222 or through another input device, the controller 260 may dispense value to the player at block 362, based on the outcome of the games played by the player. The controller 260 may then cause the display unit 222 to display attraction graphics to operate in attraction mode to attract another player. If the player did not wish to quit as determined at block 360, the program may branch back to block 306 where another game may be played by the player.

Combination Game

Figure 4:
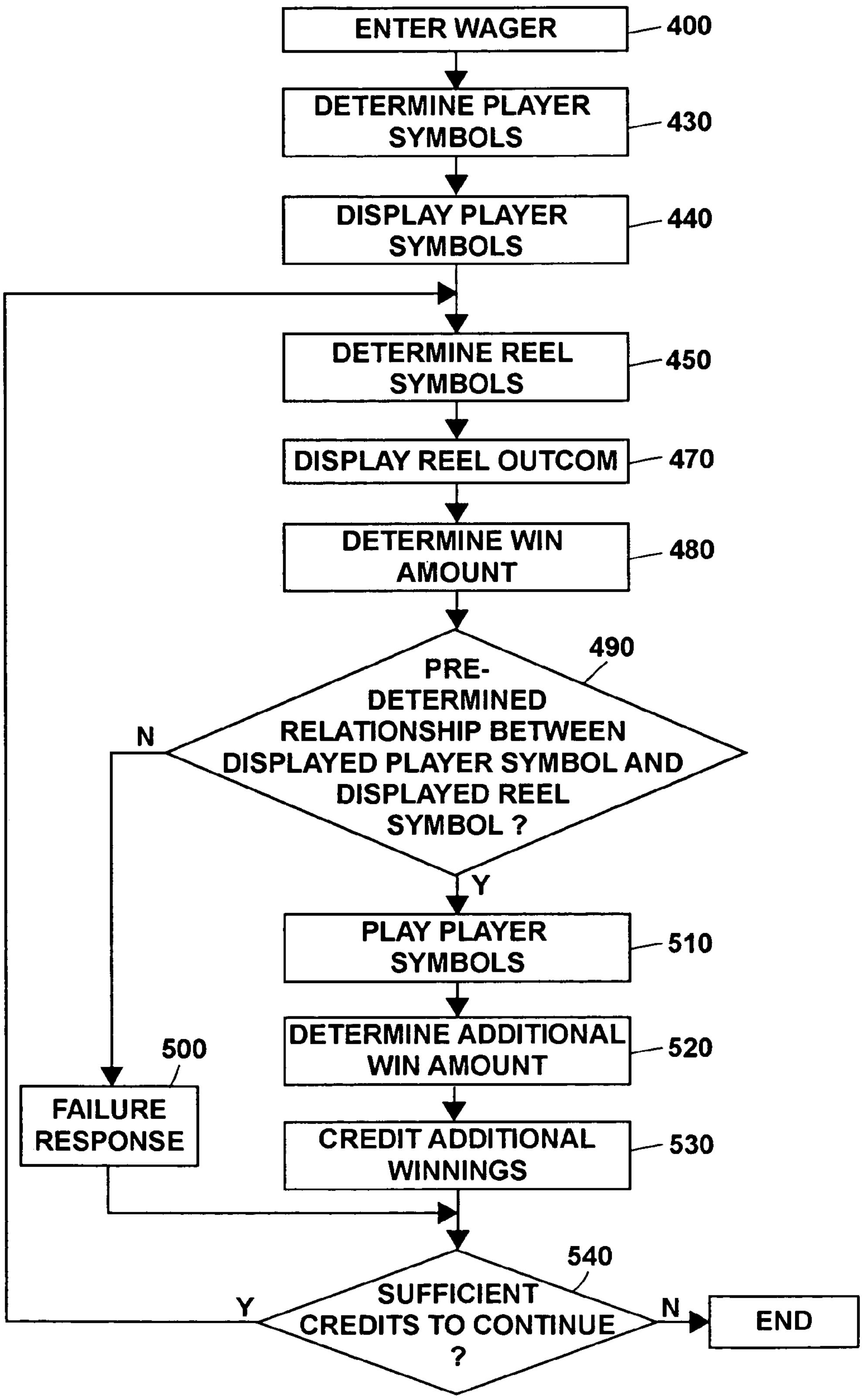
FIG. 4 is a flowchart of a combination game routine that may be performed by the controller shown in FIG. 2.
Figure 5:
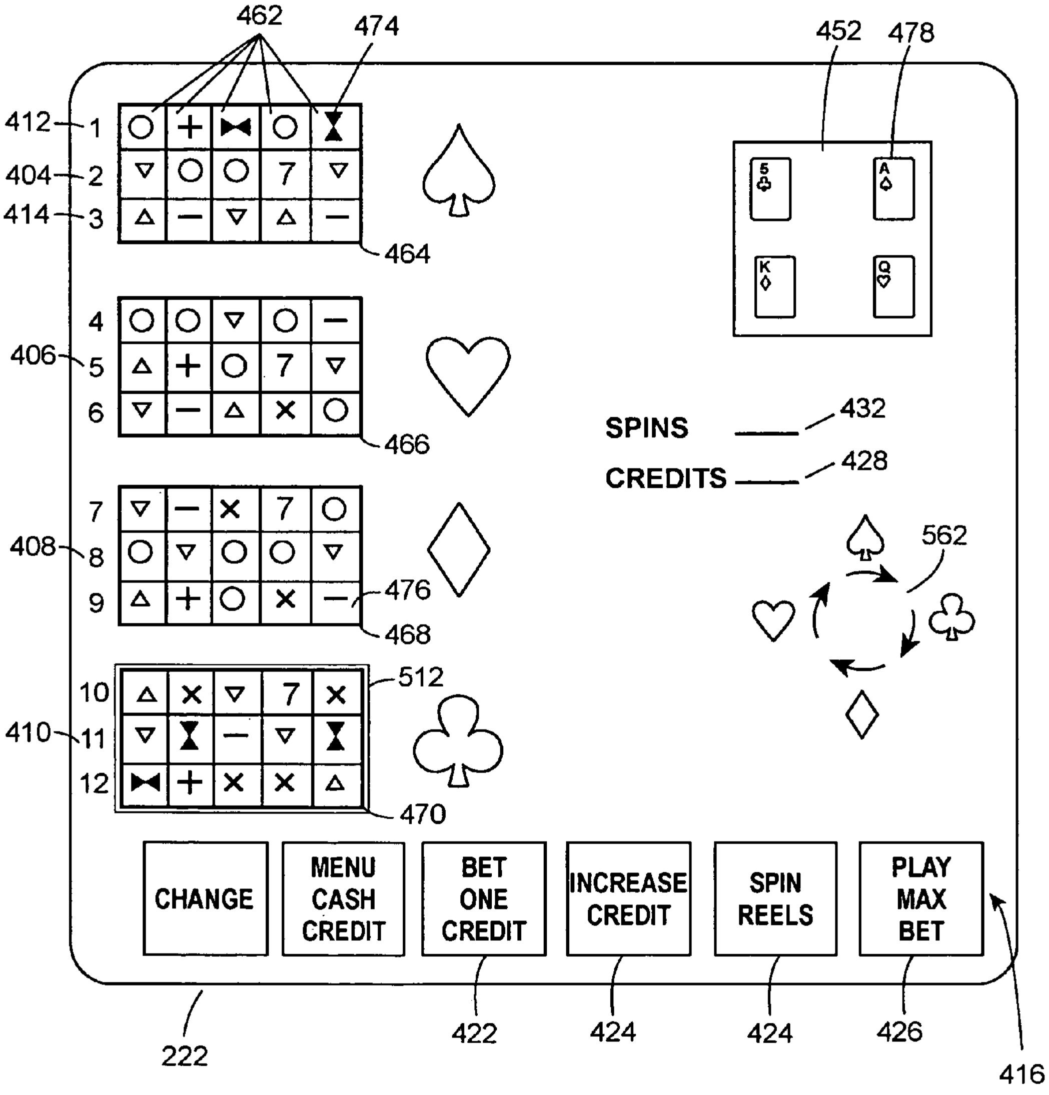
FIG. 5 is an illustration of a visual display that may be displayed when the controller of FIG. 2 performs the combination game routine of FIG. 4.

The gaming unit 42 may be provided with a combination game. FIG. 4 is a flowchart of one manner of operating the combination game routine 306 and FIG. 5 is an exemplary display that may be shown on the gaming display unit 222 during performance of the combination game. Referring to FIG. 4, the combination video slots routine 306 may begin at block 400 at which a player may make a wager. A wager may include allowing a player to select a number of paylines, to select an amount to be bet on each payline and to select a number of spins to be included in a round. Referring to FIG. 5, a variety of paylines 402 may be available. Some paylines 402 may run directly across the displayed reels such as the paylines 404, 406, 408 and 410. Other paylines 402 may run at angles across a plurality of displayed reels such as paylines 412 and 414. The paylines 402 may have a single element from each displayed reel.

A player may select paylines 402 in a variety of ways. The player may simply choose to play all available paylines 402. The player also may select to play some of the more commonly available paylines 402 such as each payline across each reel such as paylines 404, 406, 408 and 410. Physical buttons 224, 226, 228 or touch screen buttons 416 may be provided to permit the player to select these commonly available paylines 402. In additional, the player, may use a touch screen attached to the gaming display 222 to select specific paylines 402.

The player may select a number of coins to play on each payline 402 by, for example, pressing a bet one credit button 422, an increase credit button 424 or a play max bet button 426 when prompted to select coins per payline 402. The player may be required to have sufficient credits to cover the cost of the coins per line as indicated next to the symbol "credits" 428 on the gaming display 222. For example, if a player selects five paylines 402 and selects five coins per line, the player must have at least twenty-five credits.

By depositing sufficient value, a player may be entitled to a number of spins. In the combination game, the player may be entitled to more than one spin by adding sufficient value to ensure the player will not run out of credits after a single spin. A round of the combo game is determined by the number of spins to which the player is entitled. For example, if a player added sufficient value to ensure three spins, the round would last three spins unless additional credits are gained during the round. Again, the player may be required to have sufficient credits to cover the number of spins the player desires to play as indicated next to the symbol "credits" 428 on the gaming display 222. For example, if the player has selected five paylines 402, has selected to play five coins per line and desires to play three spins, the player may be required to have 125 credits (5 paylines×5 coins per line×3 spins=125 credits). The number of spins to which the player is entitled may be displayed next to the symbol "spins" on the display device 222. A spin counter 432 may be used to track the number of spins. At a block 430, the controller 260 may determine what player symbols 452 from a player symbol set may be displayed. The controller 260 may make the determination of what player symbols 452 should be displayed by, for example, randomly selecting player symbols 452 from the player symbol set. At a block 440 (FIG. 4), the controller may display the selected player symbols 452. The number of player symbols 452 may at least be the number of spins. For example, if the player added sufficient value to ensure three spins were selected, then three player symbols 452 may be dealt to the player.

At block 450 (FIG. 4), the controller 260 (FIG. 2) may generate an outcome of the reels 462. The outcome may be a random selection from a reel symbol set. While five columns of such virtual slot machine reels 462 are shown, it should be understood that any number of columns of virtual reels 462 could be used. In addition, although four rows of slot machine reels 464, 466, 468, 470 are displayed, any number of reels and rows could be used. The reels 462 may be generated randomly subject to a schedule of available reel symbols 472 which may include player symbols 476. For, example, there may be 5 single bar symbols and 1 triple cherry symbols out of a total of 50 available reel symbols 472 or reel stops in a reel set or strip.

The reel symbol set 478 may have symbols that are not included in the player symbols 452. In other words, the player symbol set 452 may be a subset of the reel symbol set 478. In addition, more than one player symbol 476 may be included in the displayed reel symbols 474. The reel symbol set 478 and player symbol set may include a traditional fifty-two card deck of cards or a deck of UNO cards. Other reel symbol sets 478 and player symbol sets 452 may be acceptable.

A block 470 (FIG. 4) may display the outcome of the reel symbols 474, including any reel symbols 474 that may be player symbols 452. The controller 260 (FIG. 2) may cause the gaming display 222 to display a sequence of images that simulate the sequential stopping of each of the reels 462. The reels 462 may be stopped from left to right, from the perspective of the player, or in any other manner or sequence. A block 480 (FIG. 4) may determine an award amount from all the purchased paylines 402. The award amount may be determined according to any rules of video slots. For example, if the reels 462 have stopped in such a manner that a purchased payline 402 contains large payout symbols, the player may receive a large payout. In addition, the generation of certain reel symbols 474 may result in the player being able to play a bonus event, such as an additional spin, or an entire additional bonus determining event. The winnings may be credited to the player. If, however, the virtual reels 462 have stopped in such a manner that there is no payout, the player loses the money that was wagered at the blocks 400.

A block 490 (FIG. 4) may determine whether one of the displayed player symbols 452 has a predetermined relationship to one of the displayed reel symbols 474. If one or more of the displayed player symbols 452 has a pre-determined relationship to one of the displayed reel symbols 474, the displayed related player symbols 452 may be highlighted on the gaming display 222 to signify to the player of the opportunity to play the related displayed player symbol 452 on the related displayed reel symbol 426. The rules to determine whether a player symbols 452 has a pre-determined relationship (or is related) to a reel symbol 474 and may be played vary depending on the reel symbol set 478 and the specific rules for the reel symbol set 478. For example, if the reel symbol set 478 contains traditional playing cards, a heart may be able to be played on a heart and a club may be able to be played on a club. In addition, player symbols 452 with the same face may be able to be played on reel symbols 476 with the same face. For example, if the reel symbol set 478 contains traditional playing cards, a seven of clubs could be played on a seven of diamonds and a jack of hearts could be played on a jack of clubs. In some games, certain player symbols 452 may be wild and can be played on any card. As another example, the reel symbol set 478 could contain a deck of traditional UNO playing cards and cards of the same color could be played on each other and cards with the same face could be played on each other. For example, if the reel symbol set 478 contained UNO playing cards, a green seven could be played on a green three, a green four could be played on a yellow four and a yellow SKIP could be played on a red SKIP. Additionally, because the UNO deck has cards such as WILD, WILD DRAW FOUR, DRAW TWO, REVERSE and SKIP, additional possibilities may be available. For example, the WILD card could be played on any reel symbol 476 and a WILD DRAW FOUR card could be played on any reel symbol 476 and the player may be dealt four more cards that would be totaled and used as the amount by which the original winning is multiplied.

In terms of game strategy, a variety of decisions will be faced by a player in determining which of the displayed player symbols 452 should be played at what time. For example, if a player has not won any amount on any of the paylines 402 that were purchased at block 400, the player may wish to play the displayed player symbol 452 with a low face value, thereby saving the displayed player symbol 452 with a higher face value for a later spin with a higher payout may be available. In addition, while a player may desire to save higher valued displayed player symbol 452 for spins during the round with a higher payout, a player may on a subsequent spin be unable to play any symbol 452, enacting a failure response that may end the game, meaning the displayed higher value player symbols 452 the player saved may end up worthless.

If none of the displayed player symbols 452 may be played, a block 500 (FIG. 4) may execute a failure response. The failure response may be that the game may end for the player, even if the player has added sufficient value for additional spins. The failure response also may be that the spin count for the player is reduced by one. Other failure responses may be possible such as deducting credits from a player or denying a bonus.

If one or more of the displayed player symbols 452 can be played, at a block 510 (FIG. 4), the player may be prompted to play the related displayed player symbols 452. A block 520 (FIG. 4) may determine an additional award amount where the additional award amount may be determined by multiplying the original award amount from block 480 (FIG. 4) by the value of the player symbol 452 played. A block 530 (FIG. 4) may credit the additional winnings calculated to the player. The value of the player symbol 452 may be determined by a schedule or by commonly accepted rules of cards. For example, if the reel symbol set 478 contains a traditional deck of playing cards, cards with numbers would be worth the number on their face, face cards would be worth ten and an ace would be worth eleven meaning the previous award amount may be multiplied by the card value as previously defined. In another example, if the reel symbol set 478 was a deck of UNO playing cards, cards with numbers may have the value on their face, REVERSE, SKIP, DRAW TWO and WILD would be worth twenty and WILD DRAW FOUR would be worth fifty. In yet another example, playing the REVERSE card would cause the controller 260 (FIG. 2) to alter the evaluation of the purchased paylines 402 by, for example, changing the evaluation to a right to left fashion rather the traditional left to right fashion which may result in additional wins for the player. Other variations to the combination game based on the card played may be possible. The additional award amount also may just apply to those paylines 402 which pass through the displayed reel symbol 476 where the related displayed player symbol 452 was played. For example, if the player played a displayed player symbol 452 on the lowest reel row 470, the player may only receive a bonus on those paylines 402 passing through the played player symbols 452.

Playing displayed player symbols 452 may also affect future spins during a round. For example, if the reel symbol set 472 includes a traditional set of UNO cards, playing a WILD card on the blue reel line may mean any blue cards would be wild in the next round or any blue cards may be wild in the next several rounds. Playing a WILD card also may result in the lowest cards in a future spin being wild. For example, playing a WILD card would result in two wild symbols in the next spin of the reels. The two wild symbols may replace the two lowest valued symbols in the symbol hierarchy. In another example, if a player played a DRAW TWO card, the player may be entitled to two wild cards on the next spin or may be entitled to two wild cards on all future spins in the round.

A block 540 (FIG. 4) may determine whether the player has sufficient credits to continue. If the player credit amount is not at a game ending value, the game may return to the step 450 where another outcome of reels may be generated. If the player credit amount or the spin counter 432 is at an ending value, the game may return to block 360 (FIG. 3) where a player may be queried regarding continuing the game.

The controller 260 (FIG. 2) may further be programmed to execute a bonus mode in response to selected outcomes from the game. For example, a specific reel combination may trigger a bonus mode in which one or more free spins awarded, additional symbols are dealt or increased value payouts are available. To alert the player to the bonus mode, the controller 260 may activate audio, video, or other cues.

In addition, the controller may adjust the payout to the player depending on the location the player symbol is played on the reel symbols. For example, a particular payline may be a bonus payline and if a player symbol is played on a displayed reel symbol on the bonus payline, a higher return may be generated. As another example, a particular column of displayed reel symbols may be a bonus column which generates a higher return when a displayed player symbol is played on a displayed reel symbol in the bonus column. As yet another example, a particular set of reels may be designated as a bonus reel set which generates a higher return when a displayed player symbol is played on a displayed reel symbol in the bonus reel set. In addition, the controller may adjust the bonus reel set 512.

Figure 6:
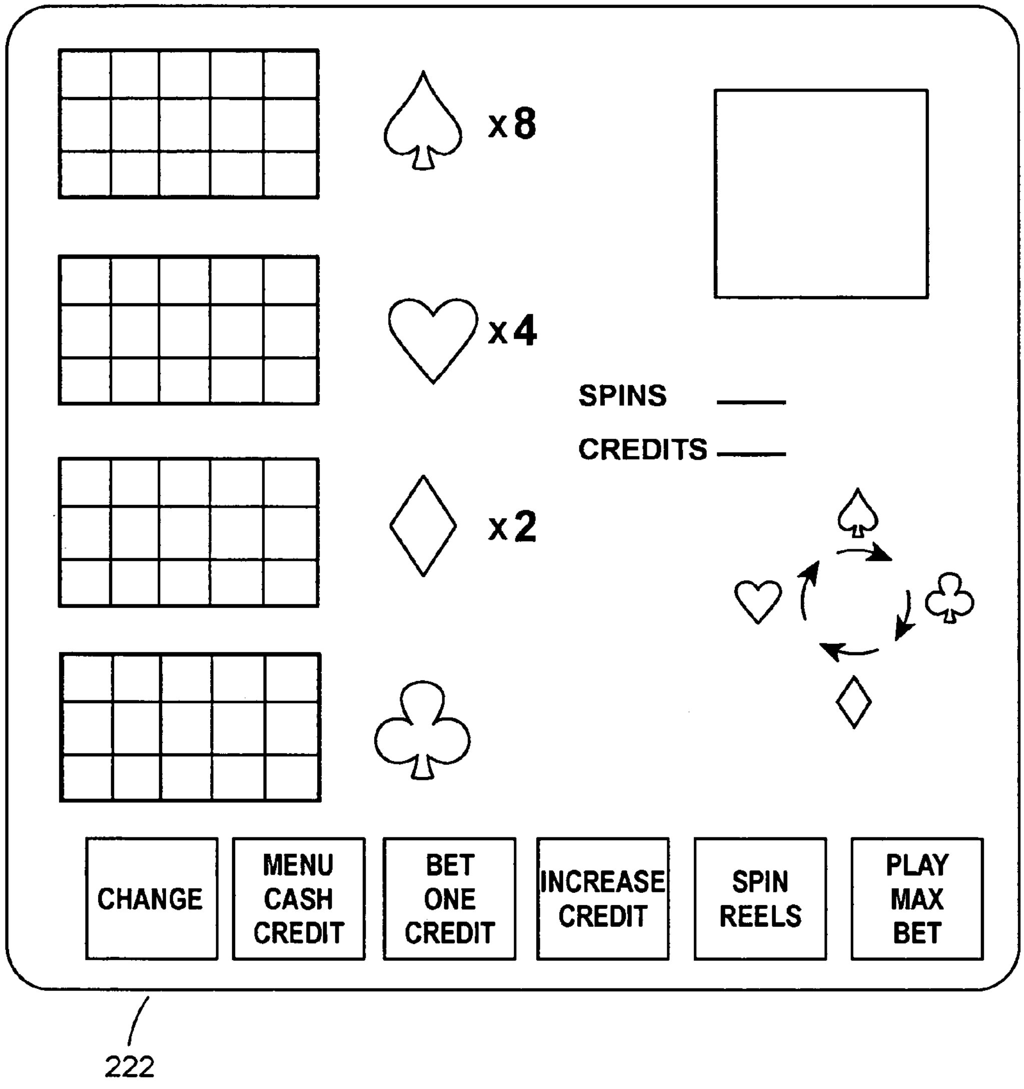
FIG. 6 is an illustration of a visual display that may be displayed when the controller of FIG. 2 performs the combination game routine of FIG. 4.

Initially, the reel set with the lowest potential payback may be the bonus reel set 512. The reel set with the lowest potential payback may also be the lowest reel set on the gaming display. In addition, each reel set above the lowest reel row may have a higher potential payback than the row below it. The importance of the bonus reel set 512 may be that the bonus reel set 512 may be the basis to determine the bonus amount the player may win. For example, if a player has purchased a payline 402 which resulted in three bars, the payout to the player may depend on which reel set is the bonus reel set 512. For example, the lowest reel set may have a payout of $10,000, and the payout of the highest reel set may be part of a wide area progressive game and the payout may be in the millions of dollars. In addition, a player may be awarded a bonus for playing a symbol on the bonus reel set 512. Accordingly, it may be advantageous to a player to attempt to play on the highest reel set 512 as possible to maximize the potential return to the player. In addition, as illustrated in FIG. 6, the reel sets may have a multiplier of 2, 4, and 8 respectively.

The bonus reel set 512 may be adjusted in a variety of ways. One manner of adjusting the bonus reel set 512 may have a progression indicator 562 on the gaming display and as the player is able to play the displayed player symbol 452, the progression indicator 562 will move up one unit in the progression of the reel sets. For example, the game may have four reel sets 464, 466, 468, 470 with the reel sets 464, 466, 468, 470 having an increasing potential return. In addition, the reel sets may be identified by the four suits in a traditional deck of 52 cards in which the lowest potential return slot set may be identified as the club reel set 470, the next highest potential returning slot set may be identified as the diamonds reel set 468, the next highest potential returning slot set may be identified as the hearts reel set 466 and the highest potential returning slot set may identified as the spades reel set 464. Accordingly, as each player symbol 452 is played, the player may progress from the club reel set 470 to the diamond reel set 468 to the heart reel set 466 to the spade reel set 464. This progression may be noted on the progression indicator 562.

Other options in relation to the progression indicator 562 may be available. For example, if the reel symbol set 478 includes a traditional deck of UNO cards, playing a REVERSE card would change the direction of the progression through the reel rows 470, 468, 466, 464. In addition, the REVERSE card may advance the player one reel set in the opposite direction. Also, playing a SKIP card may skip the bonus reel set 512 up one or more reel set.

Another way to adjust the bonus reel set 512 may be that if the related displayed reel symbol 476 appears in a specific reel set and the related displayed player symbols 452 can be played on that displayed reel symbol 476, the specific reel set with the related symbol 476 may become the bonus reel set 512. For example, if the initial bonus reel 512 is the clubs reel 470 and the player is able to play the player symbol 452 on the higher spades reel set 464, the spades reel set 464 would become the bonus reel set 512.

In another way to adjust the bonus reel set 512, the displayed player symbol 452 that is played may determine what the future bonus reel set 512 will be. For example, if the reel symbol set 478 includes a deck of traditional four suit, fifty two cards and if the reels are signified by different suits, the player may be able to move to a different bonus reel set 512 by playing a card with the suit of the reel set the player desire to move to. For example, if the player begins on the club reel set 470 and the player plays a heart, the new bonus reel set may be the heart reel set 466.

Although the bonus reel set 512 is described as being a plurality of reel rows, a single reel may be displayed and a paytable and symbol set may be adjusted on the single reel line to signify the changing bonus reel set. For example, if the player plays the player symbol 452 on the related reel symbol 476 and the player has earned the right to advance to a more desirable bonus reel set 512, the controller 222 may internally change its paytable and symbol set to be more advantageous to the player. In addition, this internal change may be signified by the progression indicator 562. As another example, if the progression of reel sets was represented by suits of a traditional 52 card deck, the suit representing the current reel may be displayed next to the single reel to signify the particular reel suit the player is playing on.

Again, there are other ways to reward a player with a bonus for playing a player symbol 452 in a specific manner. For example, bonus columns, bonus paylines, and bonus regions could be designated where the reward to the player is greater than the value of simply playing a player symbol 452 on a reel symbol 476. Further, the player may be inclined to use strategy in the manner of playing player symbols 452 on reel symbols 476 based on the bonus regions.

Figure 7:
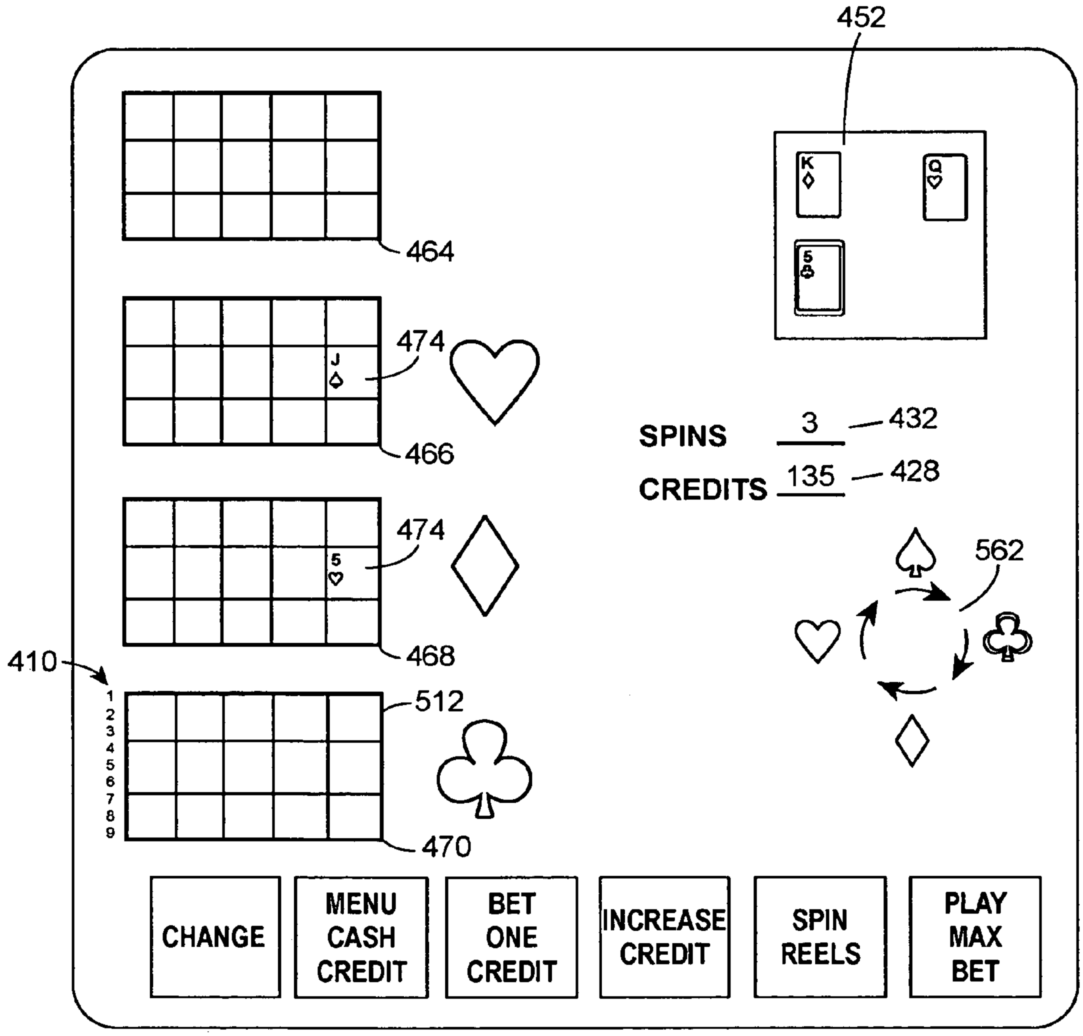
FIG. 7 is an illustration of a visual display that may be displayed when the controller of FIG. 2 performs the combination game routine of FIG. 4.

As an example, in FIG. 7 a player may deposit sufficient monetary value for three spins of the reels 462. This monetary value also may entitle the player to three player symbols 452. The player may spin the reels 462 and three player symbols 452 may be provided to the player. The reels in the spade reel set 464, heart reel set 466, diamond reel set 468 and club reel set 470 may spin. Initially, the player may be awarded the result of the playlines 410 purchased on the club reel set 470 which may have the lowest expected return. The player symbol 452 of the five of clubs may be highlighted as a player symbol 452 that may have a pre-determined relationship to a reel symbol 474 displayed (the other reel symbols are illustrated as being blank but could be any reel symbol). Accordingly, the player may play the five of clubs on the reel symbol 474 five of hearts which is displayed in the diamond reel set 468. By playing a player symbol 452, the player may be awarded a bonus amount.

Figure 8:
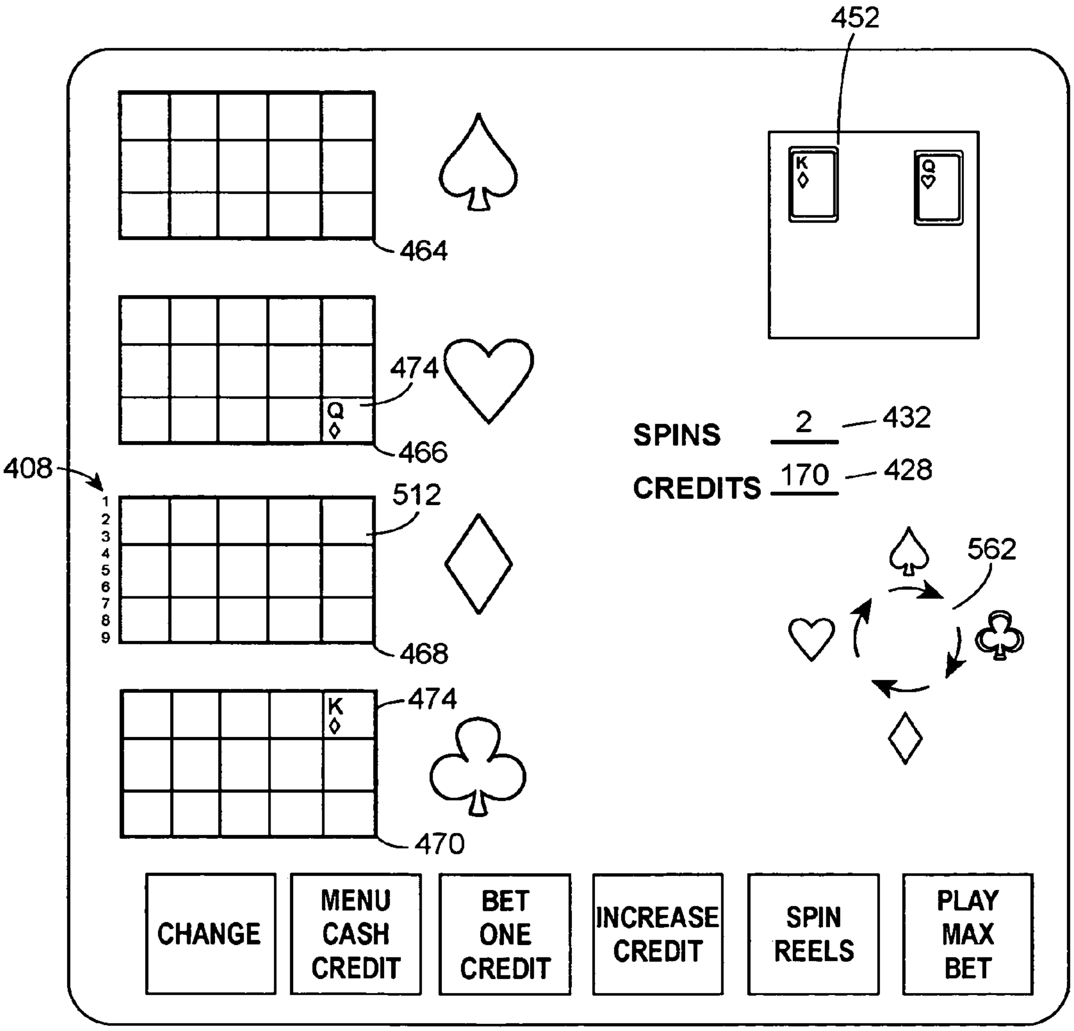
FIG. 8 is an illustration of a visual display that may be displayed when the controller of FIG. 2 performs the combination game routine of FIG. 4.

FIG. 8 may be an example of a display after a player has played the player symbol (the five of clubs) 452 on the diamond reel set 468. As a result of playing on the diamond reel set 468, the diamond reel set 468 may be the new bonus reel set 512. The player may spin the reels 462 again and be awarded the amount from the purchased paylines 408 in the diamond reel set 468. In addition, both the player symbols 452 the king of diamonds and the queen of hearts may be highlighted as they both may have a pre-determined relationship with reel symbols 474 displayed, specifically, the player symbol 452 the king of diamonds may be played on the reel symbol 474 king of diamonds displayed in the clubs reel set 470 and the player symbol 452 the queen of hearts may be played on the reel symbol 474 queen of diamonds displayed in the hearts reel set 466 (the other reel symbols are illustrated as being blank but could be any reel symbol). The player may decide to play the player symbol 452 queen of hearts on the reel symbol 474 queen of diamonds displayed in the hearts reel set 466. The player would then be awarded a bonus for playing the player symbol 452 the queen of hearts. The bonus may be the win amount from the paylines 402 purchased in the diamond reel set 468 multipled by the value of the queen of hearts, ten.

Figure 9:
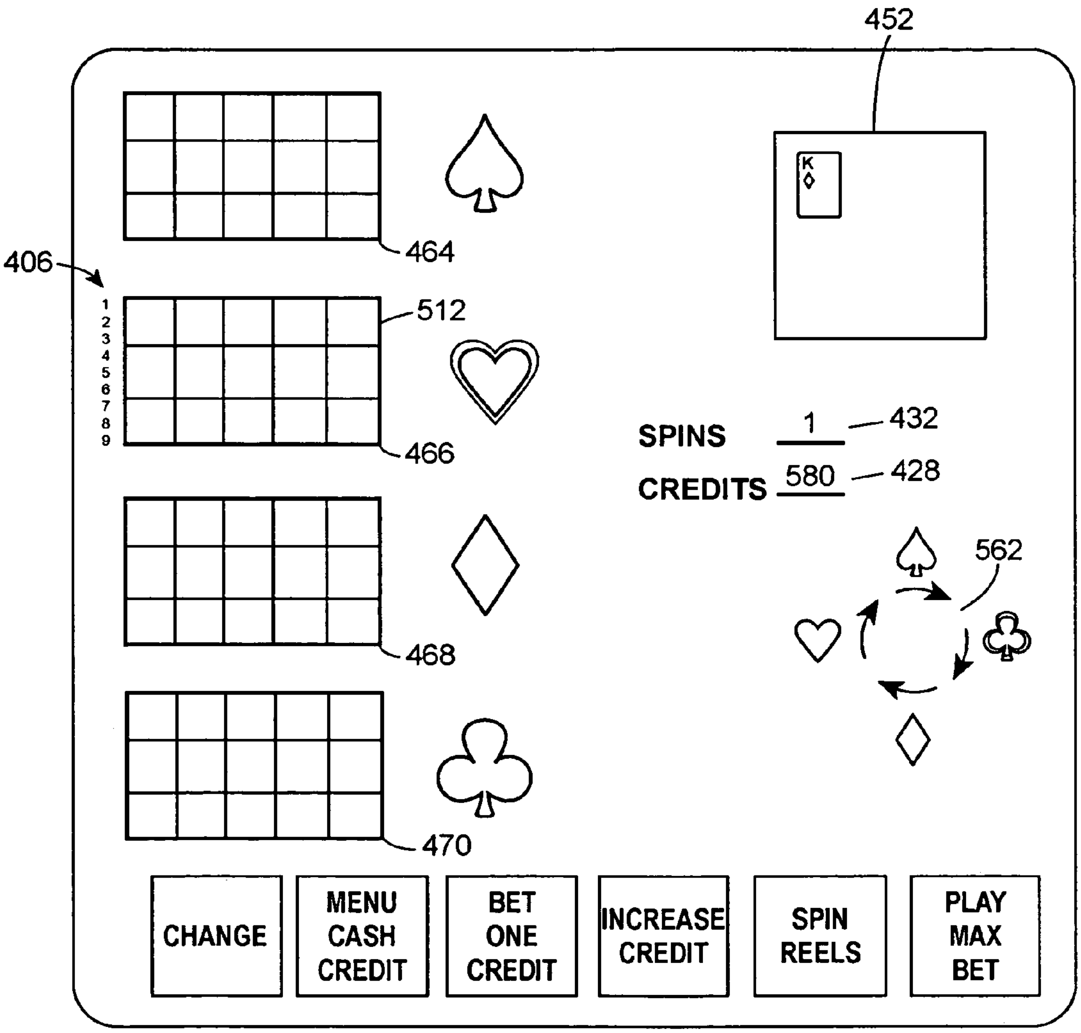
FIG. 9 is an illustration of a visual display that may be displayed when the controller of FIG. 2 performs the combination game routine of FIG. 4.

FIG. 9 may illustrate a display after a player symbol 452 such as the queen of hearts, is played. In FIG. 9, the heart reel set 466 may be the bonus reel set 512 because the player symbol 452 was played in this reel set 466 during the previous spin. As previously explained, the reel sets 464, 466, 468, 470 may rotate as the bonus reel set 512. The player may spin the reels 462 again. In this case, no reel symbols 474 are displayed that have a pre-defined relationship with the lone player symbol left 452, the king of diamonds (the reel symbols are illustrated as being blank but could be any reel symbol). The player will be awarded the amount from the purchased paylines 406 in the heart reel set 466 and a failure response may occur. The failure response may be the loss of a spin, which in the case in FIG. 9 would end the game.

Figure 10:
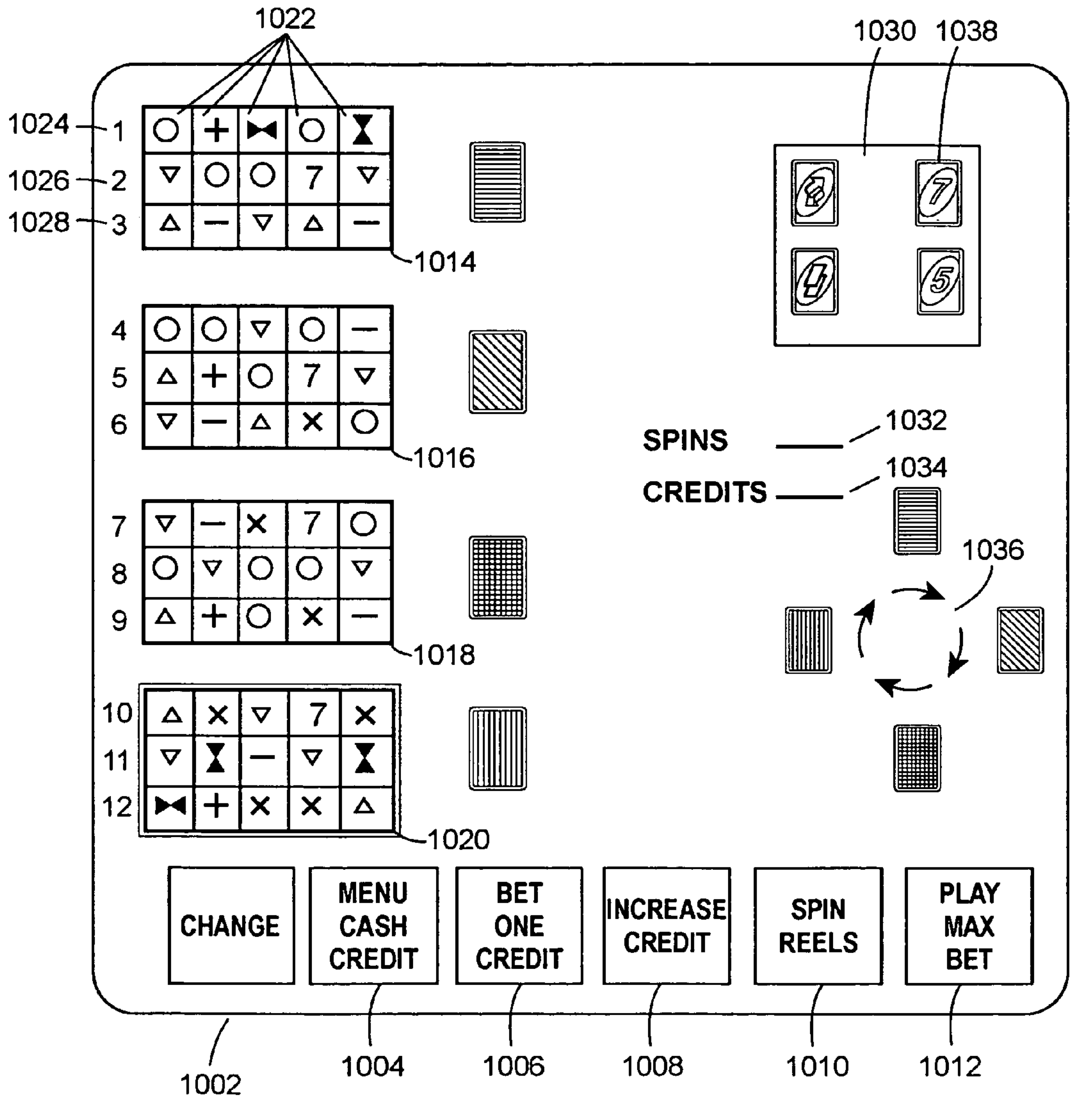
FIG. 10 is an illustration of a visual display that may be displayed when the controller of FIG. 2 performs an embodiment of the combination game routine of FIG. 4, wherein the player symbols include UNO type cards.

FIG. 10 illustrates a game display for an UNO embodiment of the claims. Similar to FIG. 5, FIG. 10 illustrates a color display unit 1002 having buttons for cash credit 1004, bet one credit 1006, increase credit 1008, spin reels 1010, and play maximum bet 1012. FIG. 10 also illustrates reels 1014-1020, paylines 1022-1028, player symbol display portion 1030, a spins display 1032, a credits counter 1034, and a progression indicator 1036. FIG. 10 illustrates that the player symbols 1038 may be UNO type cards. In addition, the reels 1014-1020 may be based on colors instead of suits, to correspond with an UNO embodiment.

What is claimed is:

1. A gaming unit, comprising:

a gaming display operable to generate images; and a controller operatively coupled to the gaming display, the controller comprising a processor and a memory operatively coupled to the processor, the controller programmed to operate with the gaming display for a play of a game to:

(a) enable a player to make a wager, (b) display a plurality of player symbols selected from a player symbol set, (c) provide a number of activations of a plurality of reels for said play of the game, said number being at least two, said reels having a plurality of reel symbols from a reel symbol set, wherein the reel symbol set includes at least one reel symbol that has a predetermined relationship to at least one player symbol from the player symbol set, (d) utilize one of said activations to cause a generation of a plurality of the reel symbols on said plurality of reels;

(e) display the generated reel symbols for said one of the activations, (f) after the generated reel symbols are displayed for said one of the activations:

(i) determine an initial award amount based on the displayed reel symbols and provide the determined initial award amount to the player, (ii) determine whether any of the displayed reel symbols have a predetermined relationship to at least one of the displayed player symbols, and (iii) if at least one displayed reel symbol has a predetermined relationship to at least one of the displayed player symbols, enable the player to choose one of the displayed player symbols which has a predetermined relationship to at least one of the displayed reel symbols to play on one of the related displayed reel symbols, said chosen one of the player symbols selected from a set of player symbols which have not previously been played in said play of the game, (iv) if one of the displayed player symbols is chosen to be played, perform at least one of:

(A) provide an additional award amount to the player, and (B) if there is at least one activation remaining for said play of the game, adjust an expected value of future payouts for at least one subsequent activation of said play of the game, said expected value of future payouts based upon the player symbol that is played, and (g) if there is at least one activation remaining for said play of the game, repeat (d) to (f) until there are no activations remaining or until all of the displayed player symbols have been played.

2. The gaming unit as defined in claim 1, wherein the reel symbol set includes the player symbol set.

3. The gaming unit as defined in claim 1, in which the controller is further programmed to execute a failure response upon determining that none of the displayed player symbols can be played on any of the displayed reel symbois, wherein the failure response is one of reducing the number of activations remaining and ending said play of the game.

4. The gaming unit as defined by claim 1, in which enabling the player to make a wager includes enabling the player to select: (i) an amount of a bet on one or more paylines, (ii) at least one payline to be wagered on, and (iii) the number of activations of the plurality of reels provided for said play of the game.

5. The gaming unit as defined by claim 4, in which the controller is programmed to set a spin counter to equal the number of activations provided for said play of the game and to display a number of player symbols for said play of the game which is at least equal to the spin counter.

6. The gaming unit as defined in claim 1, in which the reel symbol set includes a standard deck of fifty-two playing cards.

7. The gaming unit as defined in claim 6, in which the additional award amount is determined by multiplying the initial award amount by a face value of the displayed player symbol chosen to be played on the related displayed reel symbol.

8. The gaming unit as defined in claim 1, in which the reel symbol set includes a standard deck of UNO playing cards.

9. The gaming unit as defined in claim 1, in which the additional award amount depends on the displayed player symbol chosen to be played.

10. The gaming unit as defined in claim 1, in which the expected value of future payouts depends on the displayed player symbol chosen to be played.

11. A gaming unit, comprising:

a gaming display operable to generate images; and a controller operatively coupled to the gaming display, the controller comprising a processor and a memory operatively coupled to the processor, the controller programmed to operate with the gaming display for a play of a game to:

(a) enable a player to make a wager, (b) display a plurality of player symbols selected from a player symbol set, (c) provide a number of activations of a plurality of reels for said play of the game, said number being at least two, said reels having a plurality of reel symbols selected from a reel symbol set wherein the plurality of reel symbols includes at least one reel symbol that has a predetermined relationship to at least one player symbol from the player symbol set, (d) utilize one of said activations to cause a generation of a plurality of the reel symbols on said plurality of reels, (e) display the generated reel symbols for said one of the activations, (f) after the generated reel symbols are displayed for said one of the activations:

(i) determine an initial award amount based on the displayed reel symbols and provide the determined initial award amount to the player, (ii) determine whether any of the displayed reel symbols have a predetermined relationship to one of the displayed player symbols, (iii) if at least one displayed reel symbol has a predetermined relationship to at least one of the displayed player symbols, enable the player to choose one of the displayed player symbols which has a predetermined relationship to at least one of the displayed reel symbols to play on one of the related displayed reel symbols, said chosen one of the player symbols selected from a set of player symbols which have not previously been played in said play of the game, and (iv) if one of the displayed player symbols is chosen to be played on one of the related displayed reel symbols:

(A) provide to the player an additional award amount, and (B) if there is at least one activation remaining for said play of the game, adjust the expected value of future payouts for at least one subsequent activation of said play of the game based upon the player symbol played, and (g) if there is at least one activation remaining for said play of the game, repeat (d) to (f) until there are no activations remaining or until all of the displayed player symbols have been played.

12. The gaming unit as defined in claim 11, wherein the reel symbol set includes the player symbol set.

13. The gaming unit as defined in claim 11, in which the controller is further programmed to execute a failure response upon determining that none of the displayed player symbols can be played on any of the displayed reel symbols, wherein the failure response is one of reducing the number of activations and ending said play of the game.

14. The gaming unit as defined by claim 11, in which enabling the player to make a wager includes enabling the player to select: (i) an amount of a bet on each payline, (iii) at least one payline to be wagered on, and (iii) the number of activations of the plurality of reels provided for said play of the game.

15. The gaming unit as defined by claim 14, in which the controller is programmed to set a spin counter to equal the number of activations provided for said play of the game and to display a number of player symbols for said play of the game which is at least equal to the spin counter.

16. The gaming unit as defined in claim 11, in which the reel symbol set includes a standard deck of fifty-two playing cards.

17. The gaming unit as defined in claim 16, in which the additional award amount is determined by multiplying the initial award amount by a face value of the displayed player symbol chosen to be played on the related displayed reel symbol.

18. The gaming unit as defined in claim 11, in which a reel symbol set includes a standard deck of UNO playing cards.

19. The gaming unit as defined in claim 11, in which the additional award amount depends on the displayed player symbol chosen to be played.

20. The gaming unit as defined in claim 11, in which the expected value of future payouts depends on the displayed player symbol chosen to be played.

21. A gaming unit, comprising:

a gaming display operable to generate images; and a controller operatively coupled to the gaming display, the controller comprising a processor and a memory operatively coupled to the processor, the controller programmed to operate with the gaming display for a play of a game to:

(a) enable a player to make a wager wherein the wager includes selecting an amount of a bet, selecting at least one payline to be purchased and selecting a number of activations of a plurality of reels, said number being at least two, said reels having a plurality of reel symbols selected from a reel symbol set, wherein the plurality of reel symbols includes at least one reel symbol that has a predetermined relationship to at least one player symbol from the player symbol set, (b) display a plurality of player symbols selected from a player symbol set, (c) utilize one of said activations to cause a generation of a plurality of the reel symbols on said plurality of reels, (d) display the generated reel symbols for said one of the activations, (e) determine an initial award amount based on the displayed reel symbols and provide the determined initial award amount to the player, (f) determine whether any of the displayed reel symbols have a predetermined relationship to at least one of the displayed player symbols, (g) if at least one of the displayed reel symbols has a predetermined relationship to at least one of the displayed player symbols:

(i) enable the player to choose one of the displayed player symbols which has a predetermined relationship to at least one of the displayed reel symbols to play on one of the related displayed reel symbols after the reel symbols are displayed, said chosen one of the player symbols selected from a set of player symbols which have not previously been played in said play of the game, (ii) if one of the displayed player symbols is chosen to be played on one of the related displayed reel symbols, provide an additional award amount to the player, and (iii) if there is at least one activation remaining for said play of the game, adjust the expected value of future payouts for at least one subsequent activation of said play of the game based upon the player symbol played, if any, (h) if none of the dislayed reel symbols have a predetermined relationship to at least one of the displayed player symbols, execute a failure response, wherein the failure response is one of reducing the number of activations and ending the play of the game, and (i) if there is at least one activation remaining for said play of the game, repeat (c) to (h) until there are no activations remaining or until all of the displayed player symbols have been played.

22. The gaming unit as defined in claim 21, wherein the reel symbol set includes the player symbol set.

23. The gaming unit as defined by claim 21, in which the controller is programmed to set a spin counter to equal the number of activations provided for said play of the game and to display a number of displayed player symbols for said play of the game which is at least equal to the spin counter.

24. The gaming unit as defined in claim 21, in which a reel symbol set includes a standard deck of fifty-two playing cards.

25. The gaming unit as defined in claim 24, in which the additional award amount is determined by multiplying the initial award amount by a face value of the displayed player symbol chosen to be played on the related displayed reel symbols.

26. The gaming unit as defined in claim 21, in which a reel symbol set includes a standard deck of UNO playing cards.

27. The gaming unit as defined in claim 21, in which the additional award amount depends on the displayed player symbol chosen to be played.

28. The gaming unit as defined in claim 21, in which the expected value of future payouts depends on the displayed player symbol chosen to be played.

29. A method of operating an electronic gaming unit including a plurality of instructions, the method comprising:

(a) for a play of a game operable upon a wager by a player:

(i) causing a display device to display a plurality of player symbols selected from a player symbol set, (ii) causing a processor to execute the plurality of instructions to provide a number of activations of a plurality of reels, said number being at least two, said reels having a plurality of reel symbols from a reel symbol set wherein the reel symbol set includes at least one reel symbol that has a predetermined relationship to at least one player symbol from the player symbol set, (iii) causing the processor to execute the plurality of instructions to utilize one of said activations to generate and display a plurality of said reel symbols on the plurality of reels, (iv) causing the processor to execute the plurality of instructions to determine an initial award amount based on the displayed reel symbols for said one of the activations and providing the determined initial award amount to the player, (v) causing the processor to execute the plurality of instructions to determine whether any of the displayed reel symbols have a predetermined relationship to at least one of the displayed player symbols, (vi) if at least one of the displayed reel symbols has a predetermined relationship to at least one of the displayed player symbols, enabling the player to choose one of the displayed player symbols which has a predetermined relationship to at least one of the displayed reel symbols to play on one of the related displayed reel symbols after the reel symbols are displayed, said chosen one of the player symbols selected from a set of player symbols which have not previously been played in said play of the game, (vii) if one of the displayed player symbols is chosen to be played on one of the related displayed reel symbols, causing the processor to execute the plurality of instructions to perform one of:

(A) providing to the player an additional award amount, and (B) if there is at least one activation remaining for said play of the game, adjusting an expected value of future payouts for at least one subsequent activation of said play of the game based upon the player symbol played on the related displayed reel symbol, and (ix) if there is at least one activation remaining for said play of the game, repeating (iii) to (vii) until there are no activations remaining or until all of the displayed player symbols have been played.

30. The method of claim 29, wherein the reel symbol set includes the player symbol set.

31. The method of claim 29, further comprising causing the processor to execute the plurality of instructions to execute a failure response upon determining that none of the displayed player symbols can be played on any of the displayed reel symbols wherein the failure response is one of reducing the number of activations and ending the play of the game.

32. The method of claim 29, further comprising causing the processor to execute the plurality of instructions to set a spin counter to equal the number of activations provided for said play of the game and causing the display device to display a number of player symbols for said play of the game which is at least equal to the spin counter.

33. The method of claim 29, further comprising enabling the player to select an amount of a bet on each payline, to select at least one payline to be wagered on, and to select the number of activations of the plurality of reels provided for said play of the game.

34. The method of claim 29, wherein the reel symbol set includes a standard deck of fifty-two playing cards.

35. The method of claim 34, wherein the additional award amount is determined by multiplying the initial award amount by a face value of the displayed player symbol played on the related displayed reel symbol.

36. The method of claim 29, wherein the reel symbol set includes a standard deck of UNO playing cards.

37. The method of claim 29, wherein the additional award amount depends on the displayed player symbol chosen to be played.

38. The method of claim 29, wherein the expected value of future payouts depends on the displayed player symbol chosen to be played.

39. A programmed memory that is adapted to interface with an electronic gaming device having a display, an input device, and a processor operatively coupled to the display, the input device and the programmed memory, wherein the processor executes instructions stored on the programmed memory, when the programmed memory is coupled to the electronic gaming device, that enables a player to interact with the electronic gaming device to play a game, that causes the electronic gaming device to dispense value to the player at the conclusion of the game, the programmed memory comprising:

a first memory portion that stores instructions that cause the electronic gaming device to enable the player to make a wager for a play of the game;

a second memory portion that stores instructions that cause the electronic gaming device to display a plurality of player symbols selected from a player symbol set for said play of the game;

a third memory portion that stores instructions that cause the electronic gaming device for said play of the game to:

(a) provide a number of activations of a plurality of reels, said number of spins being at least two, said reels having a plurality of reel symbols from a reel symbol set wherein the reel symbol set includes at least one reel symbol that has a predetermined relationship to at least one player symbol from the player symbol set;

(b) utilize one of said activations to generate a plurality of said reel symbols on the plurality of reels;

(c) display on the display the generated reel symbols and determine and provide to the player an initial award amount based on the displayed reel symbols;

(d) determine whether any of the displayed reel symbols have a predetermined relationship to at least one of the displayed player symbols;

(e) if at least one displayed reel symbol has a predetermined relationship to at least one of the displayed reel symbols, enable the player to choose one of the displayed player symbols to play on one of the related displayed reel symbols after the reel symbols are displayed, said chosen one of the player symbols selected from a set of player symbols which have not previously been played in said play of the game;

(f) if one of the displayed player symbols is chosen to be played on one of the related displayed reel symbols, perform one of:

(i) provide to the player an additional award amount; and (ii) if there is at least one activation remaining for said play of the game, adjust the expected value of future payouts for at least one subsequent activation of said play of the game based upon the player symbol played on the related displayed reel symbol; and (g) if there is at least one activation remaining for said play of the game, repeat (b) to (f) until there are no activations remaining or until all of the displayed player symbols have been played.

40. The programmed memory as defined in claim 39, wherein the reel symbol set includes the player symbol set.

41. The programmed memory as defined in claim 39, including an additional memory portion physically configured in accordance with instructions that cause the electronic gaming device to execute a failure response upon determining that none of the displayed player symbols can be played on any of the displayed reel symbols wherein the failure response is one of reducing the number of activations and ending the play of the game.

42. The programmed memory as defined in claim 39, including an additional memory portion physically configured in accordance with instructions that would cause the electronic gaming device to set a spin counter to equal the number of activations provided for said play of the game and to display a number of displayed player symbols for said play of the game which is at least equal to the spin counter.

43. The programmed memory as defined in claim 39, in which enabling the player to make the wager includes enabling the player to select an amount of a bet on each payline, to select at least one payline to be wagered on, and to select the number of activations of the plurality of reels provided for said play of the game.

44. The programmed memory as defined in claim 39, in which the player symbol set includes a standard deck of fifty-two playing cards.

45. The programmed memory as defined in claim 44, in which the additional award amount is determined by multiplying the initial award amount by a face value of the displayed player symbol chosen to be played on the related displayed reel symbol.

46. The programmed memory as defined in claim 39, in which the displayed player symbol set includes a standard deck of UNO playing cards.

47. The programmed memory as defined in claim 39, in which the additional award amount depends on the displayed player symbol chosen to be played.

48. The programmed memory as defined in claim 39, in which the expected value of future payouts depends on the displayed player symbol chosen to be played.

* * * * *

UNITED STATES PATENT AND TRADEMARK OFFICE

CERTIFICATE OF CORRECTION

PATENT NO. : 7,588,496 B2
APPLICATION NO. : 10/226446
DATED : September 15, 2009
INVENTOR(S) : Shawn Van Asdale It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this

Fourteenth Day of December, 2010

David J. Kappos

*Director of the United States Patent and Trademark Office*